US 9,639,094 B2

(12) United States Patent
Palmer

(10) Patent No.: US 9,639,094 B2
(45) Date of Patent: May 2, 2017

(54) ELECTRONIC PNEUMATIC PRESSURE CONTROLLER

(71) Applicant: Michael D. Palmer, Palmer, MA (US)

(72) Inventor: Michael D. Palmer, Palmer, MA (US)

( * ) Notice: Subject to any disclaimer, the term of this patent is extended or adjusted under 35 U.S.C. 154(b) by 0 days.

(21) Appl. No.: 14/940,116

(22) Filed: Nov. 12, 2015

(65) Prior Publication Data
US 2016/0132061 A1 May 12, 2016

Related U.S. Application Data

(60) Provisional application No. 62/078,543, filed on Nov. 12, 2014.

(51) Int. Cl.
*G05D 16/20* (2006.01)
*F02M 21/02* (2006.01)

(52) U.S. Cl.
CPC ..... *G05D 16/2013* (2013.01); *F02M 21/0239* (2013.01); *Y02T 10/32* (2013.01); *Y10T 137/2544* (2015.04); *Y10T 137/87877* (2015.04)

(58) Field of Classification Search
CPC ............ Y10T 137/597; Y10T 137/883; Y10T 137/884; Y10T 137/2544; G05D 16/2013; F02M 21/0239; Y02T 10/32
USPC ........................................ 137/597, 883, 884
See application file for complete search history.

(56) References Cited

U.S. PATENT DOCUMENTS

| | | | | |
|---|---|---|---|---|
| 4,193,420 A * | 3/1980 | Hewson | .................. | F16K 11/22 137/356 |
| 5,209,258 A * | 5/1993 | Sharp | ........................ | G01F 1/36 137/343 |
| 5,617,898 A * | 4/1997 | Nagai | ....................... | F04F 5/48 137/884 |
| 5,819,782 A * | 10/1998 | Itafuji | ................. | F15B 13/0807 137/240 |
| 5,823,228 A * | 10/1998 | Chou | .................... | F16K 27/003 137/557 |
| 5,860,676 A * | 1/1999 | Brzezicki | ............ | F15B 13/0817 137/884 |
| 5,988,203 A * | 11/1999 | Hutton | ...................... | G01F 1/36 137/271 |
| 6,615,871 B2 * | 9/2003 | Ohmi | .................. | F15B 13/0817 137/597 |
| 7,004,199 B1 * | 2/2006 | Funes | ....................... | F17D 1/04 137/884 |
| 7,152,629 B2 * | 12/2006 | Tokuda | ................. | F16K 27/003 137/884 |
| 7,320,339 B2 * | 1/2008 | Milburn | ................ | F16K 27/003 137/884 |
| 2002/0092570 A1 * | 7/2002 | Miyazoe | ............. | F15B 13/0431 137/554 |
| 2002/0124961 A1 * | 9/2002 | Porter | ..................... | B01F 3/022 156/345.33 |
| 2004/0003853 A1 * | 1/2004 | Bankstahl | ................ | B23K 7/10 137/884 |
| 2006/0032541 A1 * | 2/2006 | Ford | ................... | F16H 61/0009 137/884 |
| 2008/0190957 A1 * | 8/2008 | Bolyard | ............. | B05C 11/1042 222/1 |

(Continued)

*Primary Examiner* — William McCalister
(74) *Attorney, Agent, or Firm* — Dunlap Bennett & Ludwig PLLC

(57) ABSTRACT

An electronic device for controlling pressure regulators, enabling remote adjustments and corrections for pressure drops and supply line expansion is provided.

8 Claims, 9 Drawing Sheets

(56) References Cited

U.S. PATENT DOCUMENTS

| | | | |
|---|---|---|---|
| 2009/0047143 A1* | 2/2009 | Cedrone | F04B 15/02 417/244 |
| 2012/0279592 A1* | 11/2012 | Manofsky, Jr. | G05D 7/00 137/597 |
| 2013/0105322 A1* | 5/2013 | Averbeck | C02F 1/008 204/554 |

* cited by examiner

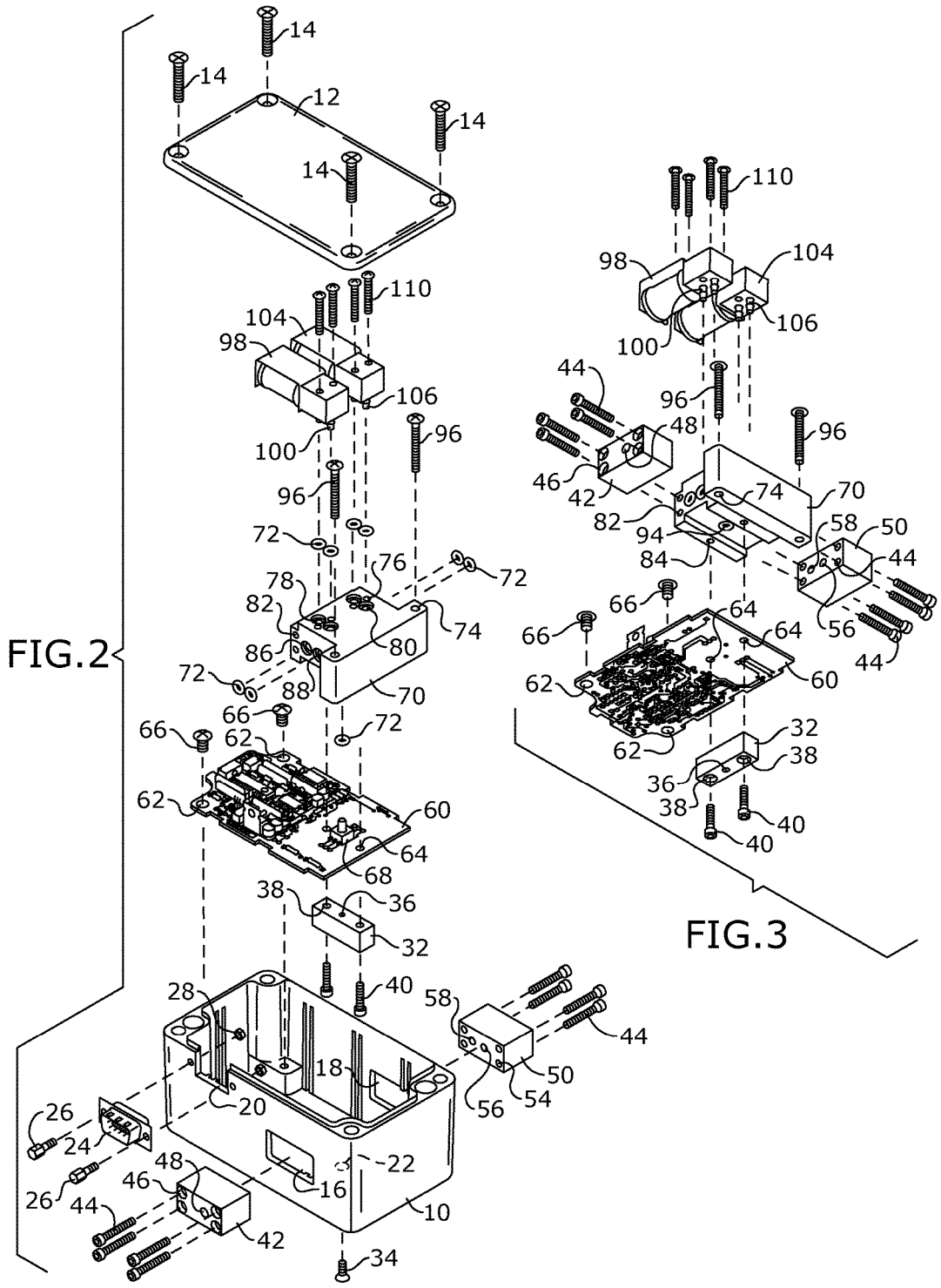

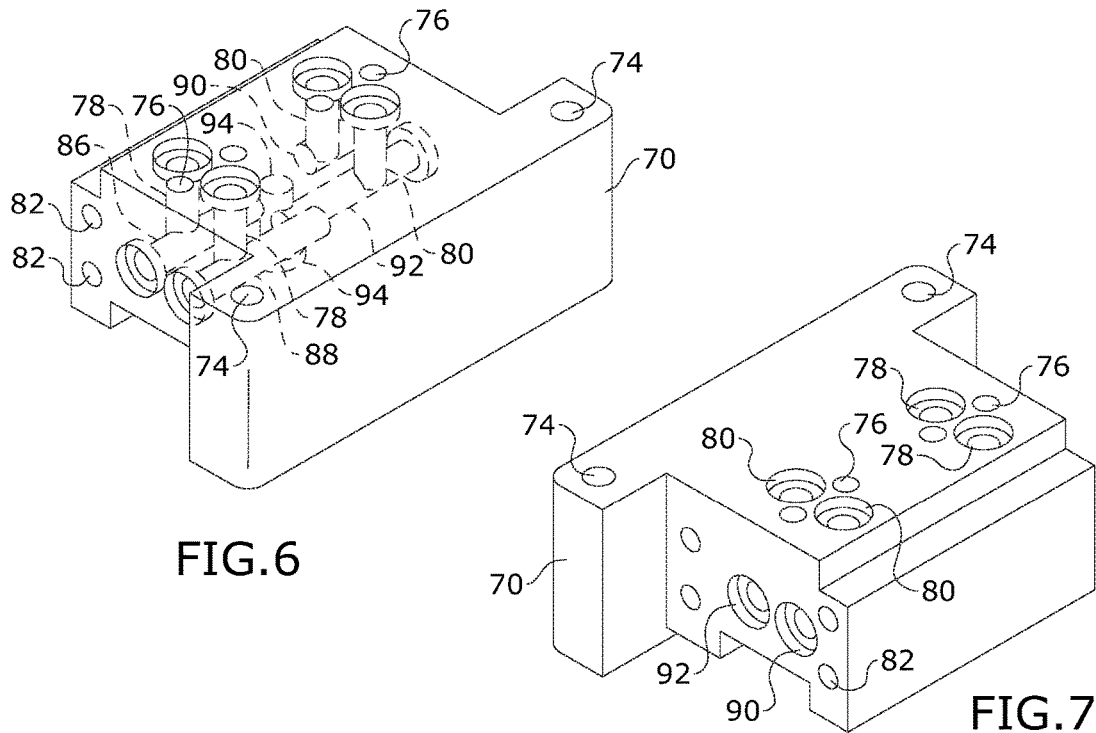
FIG.6
FIG.7
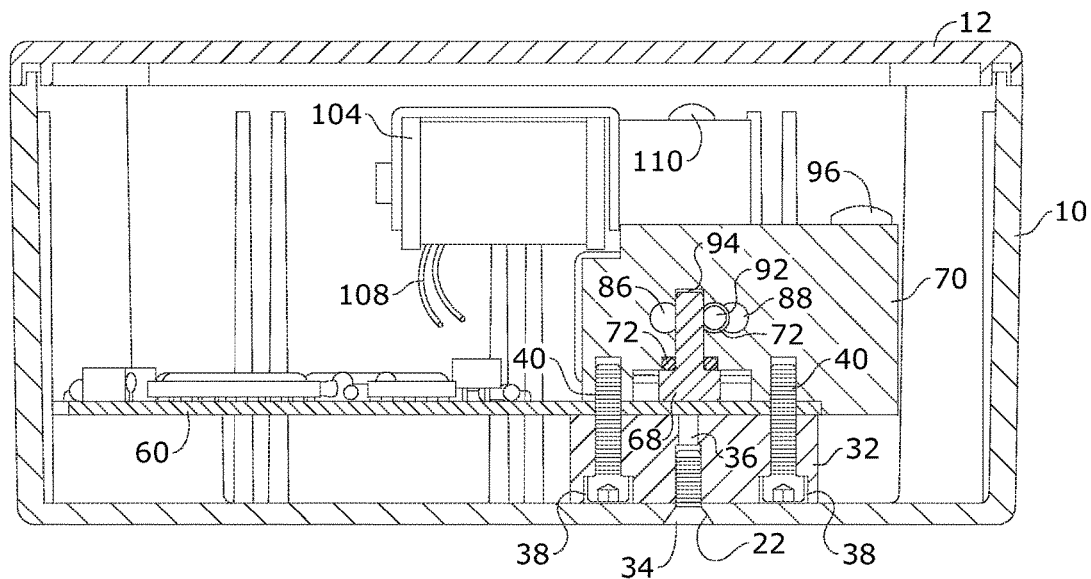
FIG.8

ELECTRONIC PNEUMATIC PRESSURE CONTROLLER

CROSS-REFERENCE TO RELATED APPLICATION

This application claims the benefit of priority of U.S. provisional application No. 62/078,543, filed 12 Nov. 2014, the contents of which are herein incorporated by reference.

BACKGROUND OF THE INVENTION

The present invention relates to pressure regulators and, more particularly, a device to electronically operate pressure regulators remotely.

Pressure regulators are used to reduce high-pressure supply lines or tanks to safe and usable pressures for various applications. Typically pressure regulators includes at least one pressure control valve designed to automatically cuts off the flow of a liquid or gas at a certain pressure or within a predetermine pressure range. Currently, many pressure regulators are adjusted manually or mechanically or require a downstream restrictive exhaust to atmosphere.

When adapted to be electronically controlled, current pressure regulatory systems employ electronic devices using an open collector voltage comparator to drive its pressure control valves without a constant current source to supply a pressure transducer, where the pressure transducer is not zero balanced. As a result, such electronic devices are constantly bleeding air to atmosphere.

As can be seen, there is a need for an electronic device that pneumatically adjusts a pressure regulator remotely and corrects for very small pressure drops and supply line expansion.

SUMMARY OF THE INVENTION

In one aspect of the present invention, a pressure regulator includes an enclosure forming a housing space housing a manifold forming at least one left port, a first right port, and a second right port; a first valve and an exhaust valve, each valve mounted to the manifold, wherein the first valve is fluidly connected to the at least one left port, and wherein the exhaust valve is fluidly connected to the second right port; a control circuitry mounted to the enclosure, wherein the control circuitry is electronically connected to the first valve and the exhaust valve for controlling pressure in at least one of the at least one left port, the first right port, and the second right port; a pressure transducer electronically connected to the control circuitry, and wherein the pressure transducer operatively engages the second right port; a left end cap extending from an outer side of the enclosure into the housing space, wherein a left cap port is formed through the left end cap, and wherein the left cap port fluidly connects to the at least one left port; and a right end cap extending from the outer side of the enclosure into the housing space, wherein a first and second cap ports are formed through the right end cap, and wherein the first and second cap ports fluidly connect to the first and second right ports, respectively.

These and other features, aspects and advantages of the present invention will become better understood with reference to the following drawings, description and claims.

BRIEF DESCRIPTION OF THE DRAWINGS

FIG. 2 is an exploded view of an exemplary embodiment of the present invention, with valve and connector wires not shown for clarity;

FIG. 3 is a detail bottom exploded view of an exemplary embodiment of the present invention of the manifold/circuit board assembly;

FIG. 6 is a perspective view of an exemplary embodiment of a manifold 70 of the present invention;

FIG. 7 is a reverse perspective view of an exemplary embodiment of the manifold 70 of the present invention;

FIG. 8 is a section view of an exemplary embodiment of the present invention, taken along line 8-8 in FIG. 5, with transducer 68 simplified for clarity;

DETAILED DESCRIPTION OF THE INVENTION

Figure 1:
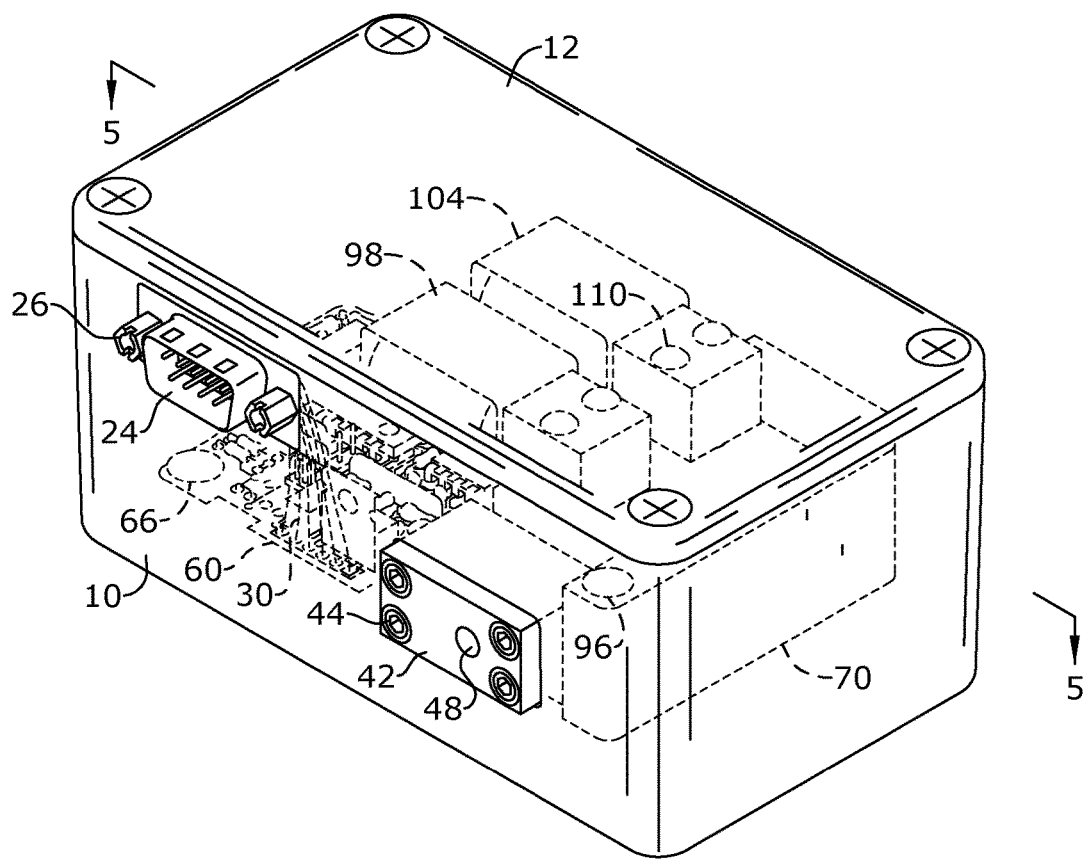
FIG. 1 is a perspective view of an exemplary embodiment of the present invention.
Figure 4:
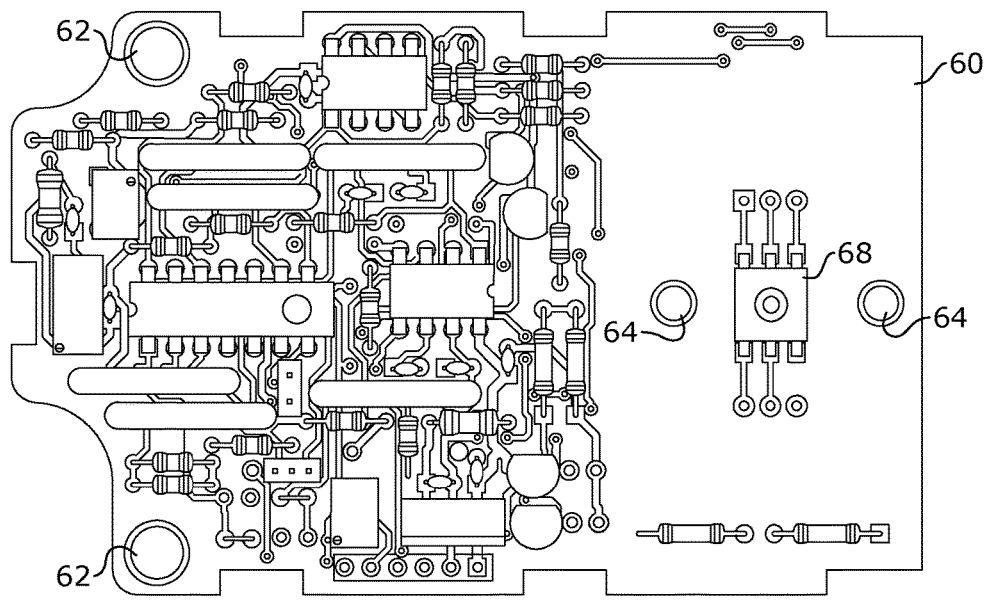
FIG. 4 is a top view of an exemplary embodiment of a control circuitry 60 of the present invention.
Figure 5:
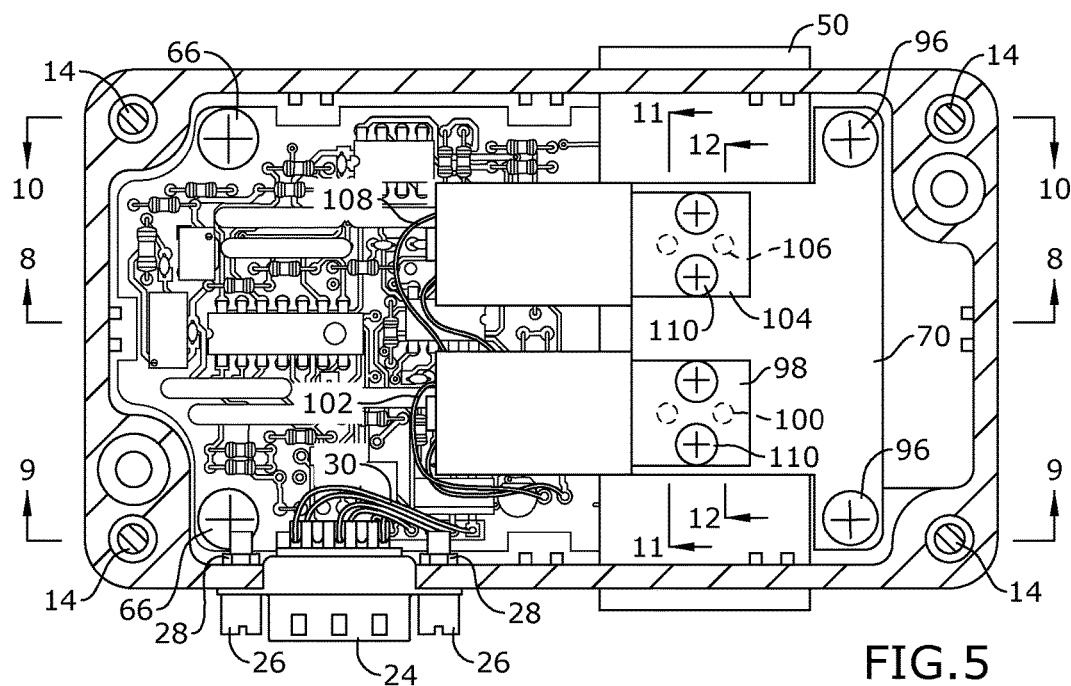
FIG. 5 is a section view of an exemplary embodiment of the present invention, taken along line 5-5 in FIG. 1.
Figure 9:
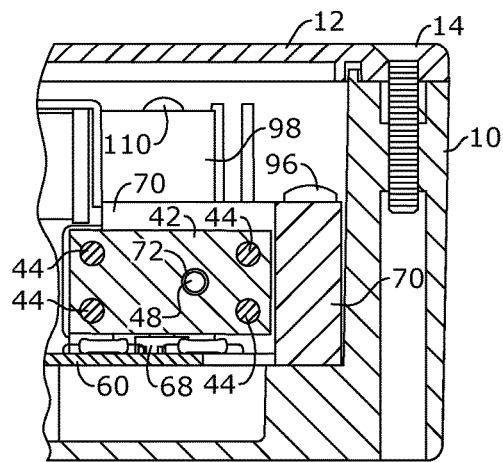
FIG. 9 is a detail section view of an exemplary embodiment of the present invention, taken along line 9-9 in FIG. 5.
Figure 10:
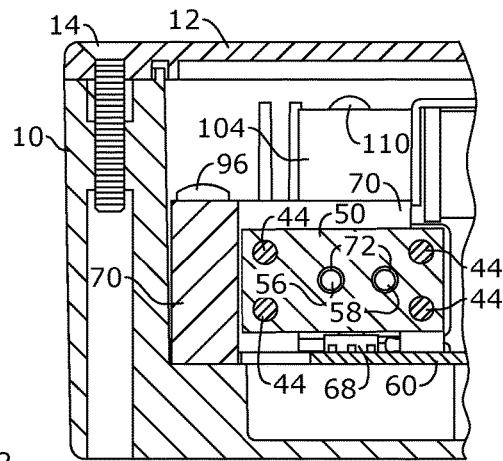
FIG. 10 is a detail section view of an exemplary embodiment of the present invention, taken along line 10-10 in FIG. 5.
Figure 11:
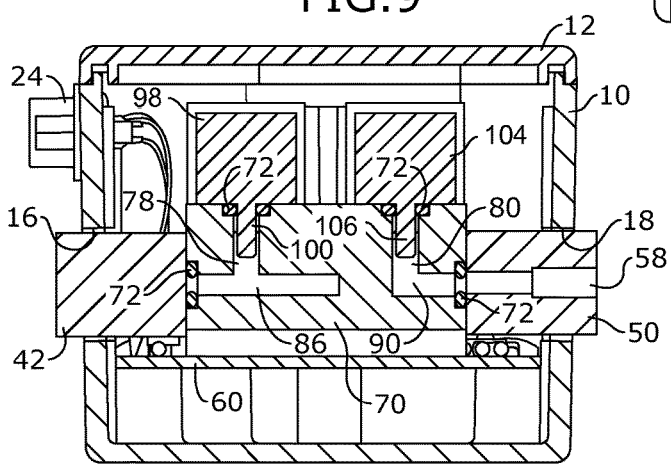
FIG. 11 is a section view of an exemplary embodiment of the present invention, taken along line 11-11 in FIG. 5, with valves 98 and 104 simplified for clarity.

The following detailed description is of the best currently contemplated modes of carrying out exemplary embodiments of the invention. The description is not to be taken in a limiting sense, but is made merely for the purpose of illustrating the general principles of the present invention.

Broadly, an embodiment of the present invention provides an electronic device for controlling pressure regulators, enabling remote adjustments and corrections for pressure drops and supply line expansion.

Referring to FIGS. 1 through 16 illustrate the present invention may include an enclosure 10 housing a control circuitry 60 operatively connected to a plurality of pressure control values in a housing space for pneumatically regulating pressure flowing through the supply and exhaust ports of the enclosure 10. The housing space may be any geometric shape so long as to function in accordance with the present invention as described herein. At least one wall 11 may define the housing space of the enclosure 10. The least one wall 11 may form a left end cap slot 16, a right end cap slot 18 and a connector slot 20, as illustrated in FIG. 2. A lid 12 may be secured to the at least one wall 11 via lid connectors 14 so as to encase the housing space.

The left end cap slot 16, the right end cap slot 18 and the connector slot 20 may each be dimensioned and adapted to receive and secure at least one left end cap 42, at least one right end cap 50, and at least one pin connector 24, respectively, wherein for each cap 42, 50 and connector 24 a first end extends through one side of the at least one wall 11 and a second end extends through an opposing side of the at least one wall 11 into the housing space. The at least one connector 24 may be secured to the at least one wall 11 by way of fasteners 26, 28. The at least one connector 24 may be electrically connected to the control circuitry 60 by connector wires 30.

Each cap 42, 50 may be fluidly connected to the plurality of pressure control valves via ports formed in a manifold 70 disposed within the housing space. The left cap 42 may form a left cap port 48 which operatively aligns with a second left port 88 formed in the manifold 70 so as to fluidly communicate thereto. The left cap 42 may be associated with the intake/supply of a pneumatic/pressure system. The right cap 50 may form a first right cap port 56 and a second right cap port 58 which operatively align with a first right port 90 and a second right port 92, respectively, formed in the manifold 70 so as to fluidly communicate thereto. The right cap 50 may be associated with the exhaust of a pneumatic/pressure system. An O-ring 72 may form a seal between each aligned ports.

The manifold 70 may be mounted to the enclosure 10 by manifold fasteners 96 through mounting holes 74 of the manifold 70. Each cap 42, 50 may form holes 46, 54, respectively, so that cap fasteners 44 may physically secured each cap 42, 50 to opposing sides of the manifold 70 via manifold fastener holes 82 formed therein.

The plurality of pressure control values may be mounted to the manifold 70 by valve fasteners 110 securing to valve fastener holes 76 formed within the manifold 70. The plurality of pressure control values may include at least one first valve 98 and at least one exhaust valve 104. The exhaust valve 104 may be a poppet valve or a proportional valve based on the configuration of the present invention. The manifold 70 may form pressure valve and exhaust valve barb holes 78 and 80, respectively, for receiving the barbs 100 and 106 of each first valve 98 and exhaust valve 104, respectively. Each barb and barb hole may be sealed by O-rings 72. Each first valve 98 and exhaust valve 104 may be electrically connected to the control circuitry 60 by electric connectors 102 and 108, respectively.

Figure 12:
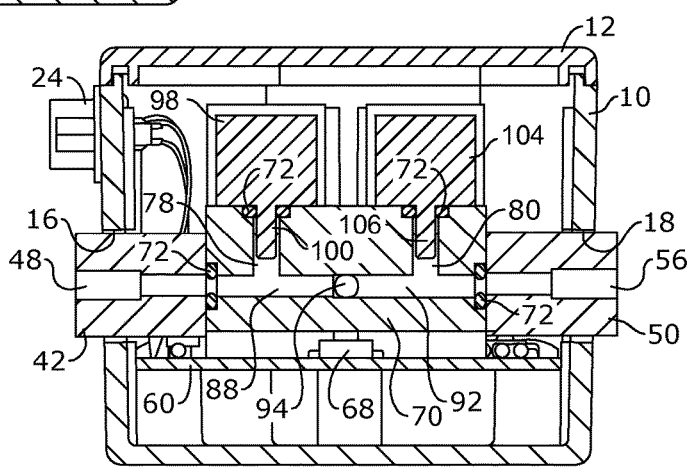
FIG. 12 is a section view of an exemplary embodiment of the present invention, taken along line 12-12 in FIG. 5, with valves 98 and 104 simplified for clarity.
Figure 13:
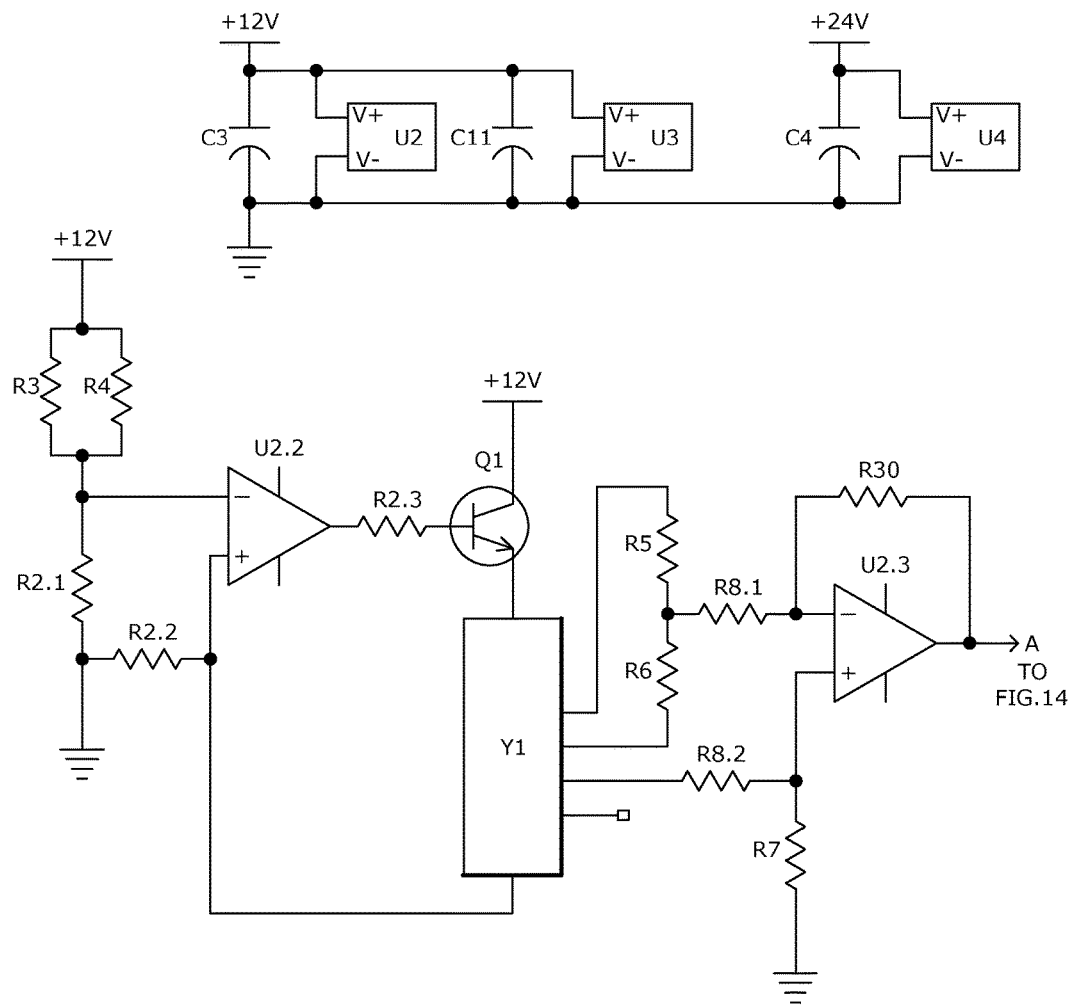
FIG. 13 is an electronic schematic view of an exemplary embodiment of the present invention.
Figure 14:
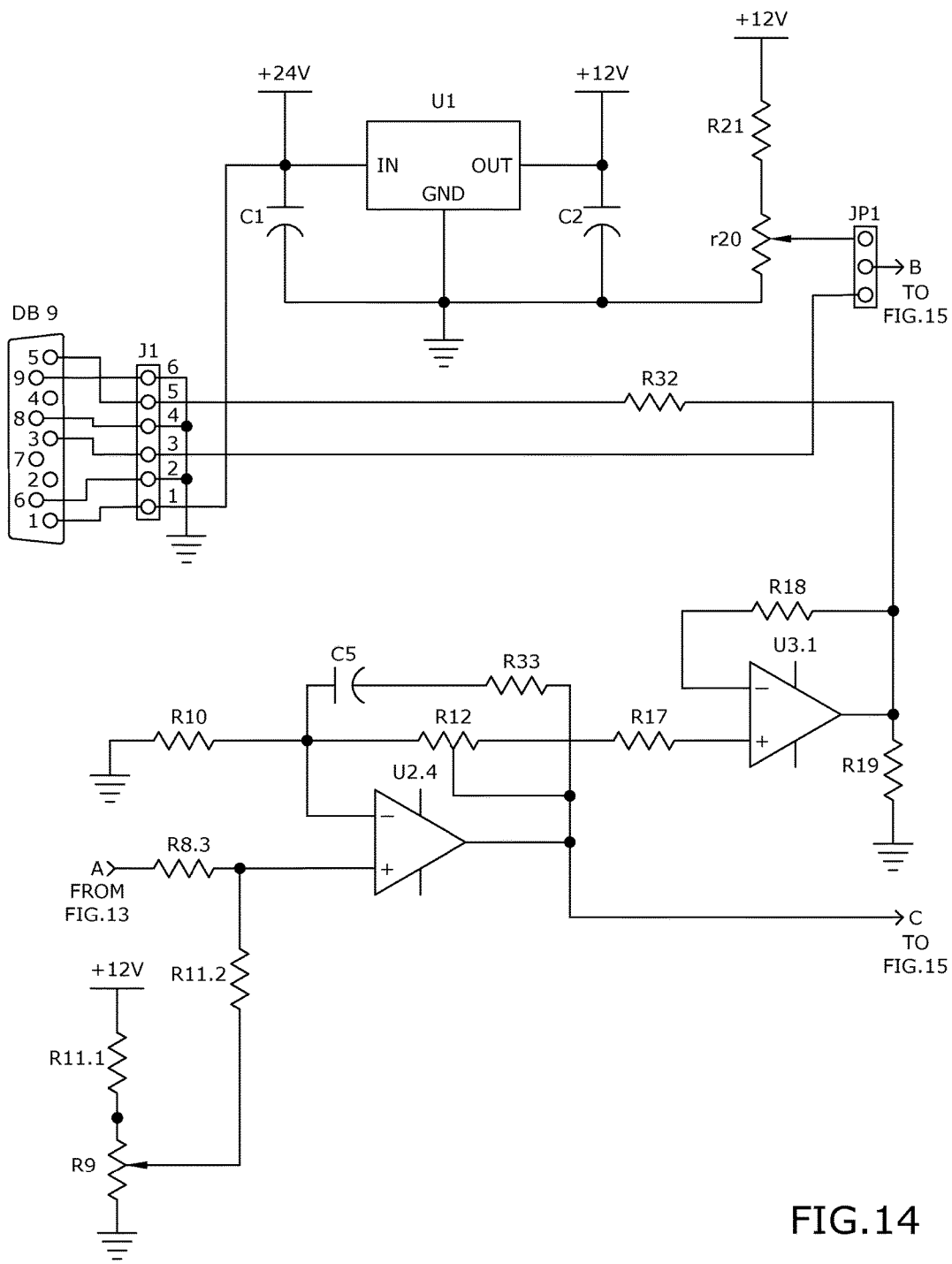
FIG. 14 is a continuation of FIG. 13.
Figure 15:
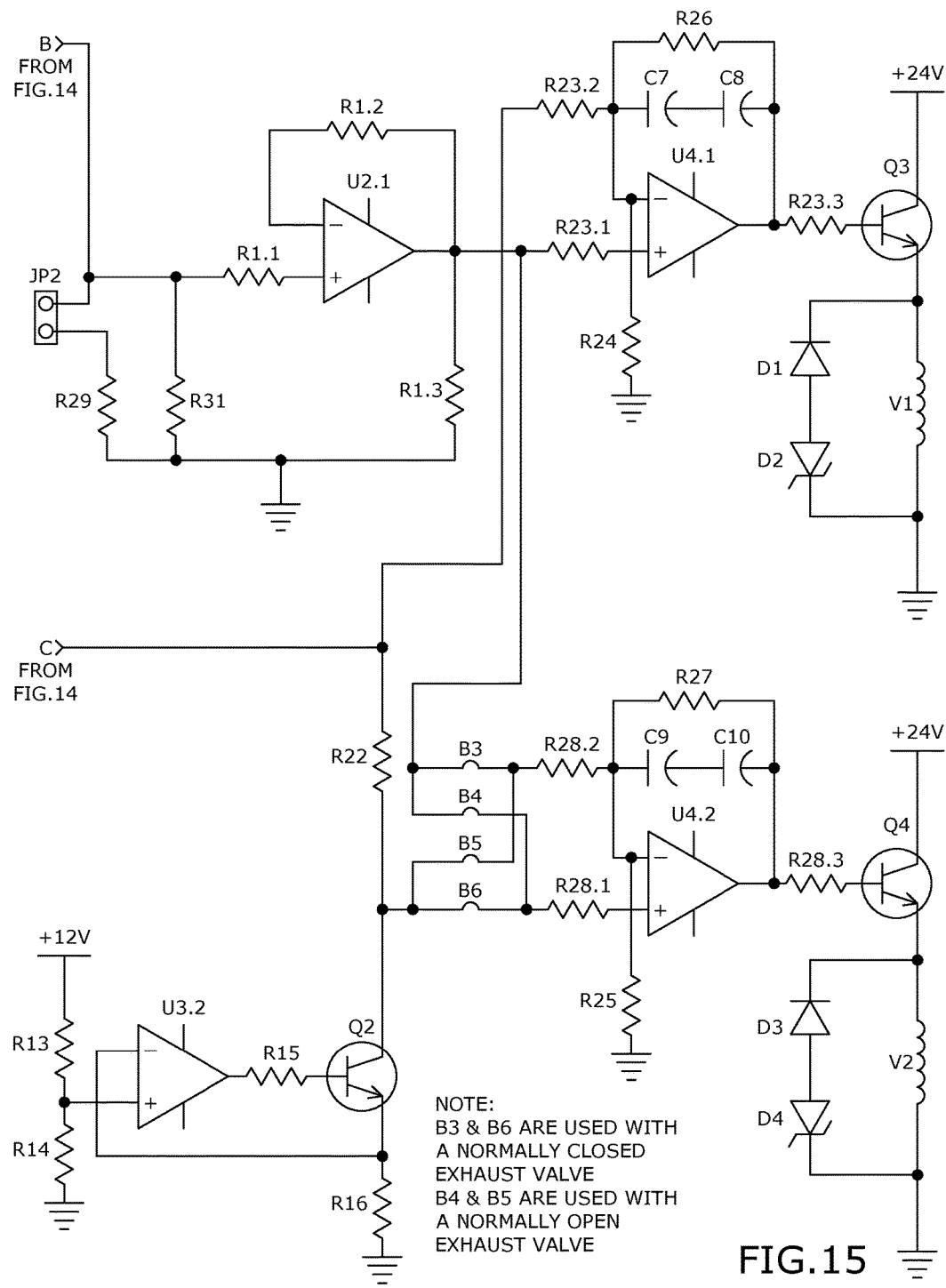
FIG. 15 is a continuation of FIG. 14.

As a result, the barb 106 of the exhaust valve 104 may be fluidly connected to the left cap port 48 through the second left port 88, while each barb 100 of the first valve 98 may be fluidly connected by way of the first and the second right port 90, 92 to the first and second cap port 56, 58, respectively. A transducer hole 94 may be disposed to fluidly connect to the second right port 92, as illustrated by FIG. 12. The transducer hole 94 receives a sensing portion of the pressure transducer 68 so that the pressure transducer 68 may monitor and control the pressure imposed within at least the second right port 92.

The ports 86, 88, 90, 92 of the manifold 70 may be staggered as illustrated in FIG. 6. The transducer hole 94 may be disposed relative to the staggered ports 86, 88, 90, 92 so that the pressure transducer 68 operatively engages both the second right port 92 and the first left port 86. Other arrangements of the ports 86, 88, 90, 92 are possible as illustrated in the figures.

Figure 16:
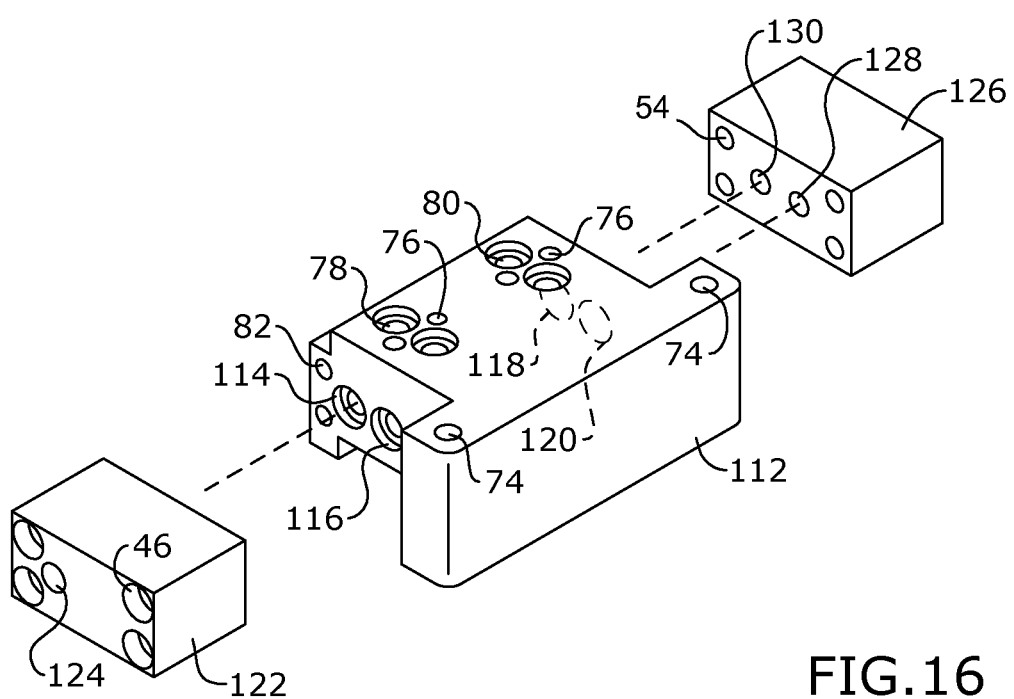
FIG. 16 is an exploded view of an exemplary embodiment of a second configuration of the manifold and end caps.

Alternatively, the present invention may include a second configuration manifold 112 having a first left port 114, a second left port 116, a first right port 118, a second right port 120; an alternative left end cap 122 with a second configuration left end cap port dimensioned and adapted to align with the first left port 114; and a second configuration right end cap 126 having a first right end cap port 128 and a second right end cap port 130 dimensioned and adapted as illustrated in FIG. 16.

The control circuitry 60 may be secured to the enclosure 10 by way of board fasteners 66 interconnecting board holes 62 formed in the control circuitry 60. The control circuitry 60 and the manifold 70 may be interconnected by way of at least one support block 32. Each support block 32 may form an enclosure hole 36 that aligns with a support hole 22 formed in the enclosure 10 so that a support enclosure fastener secures 34 both to each other, as illustrated in FIG. 2. Each support block 32 may form at least one manifold hole 38 whereby support manifold fasteners 40 secure the support block 32 to the manifold 70 by way of manifold fastener holes 84, and both secured to the control circuitry 60 by way of aligned board holes 64, as illustrated in FIGS. 2 and 3.

The control circuitry 60 may include a printed circuit board and at least one dual operational amplifier, a constant current source, and the at least one pressure transducer 68. The control circuitry 60 may provide a dual operational amplifier electronically connected to the to control the plurality of at least one first valve 98 and drive the at least one exhaust valve 104 for correcting for very small pressure drops and supply line expansion by controlling the at least one exhaust valve 104 in a proportional manner. The pressure transducer 68 may be zero balanced so as to allow for more control of the pressure at the low end of a predetermined pressure range.

The control circuitry 60 may include the following electronic components:
1. U1 LM7812C 12 Volt Regulator
2. U2 LM324N Quad Operational Amplifier
3. U3 LM358 Dual operational Amplifier
4. U4 LM358 Dual operational Amplifier
5. Q1 PN2222 NPN Transistor
6. Q2 PN2222 NPN Transistor
7. Q3 PN2222 NPN Transistor
8. Q4 PN2222 NPN Transistor
9. C1 0.1 uf/50V Capacitor
10. C2 0.1 uf/50V Capacitor
11. C3 0.1 uf/50V Capacitor
12. C4 0.1 uf/50V Capacitor
13. C5 0.47 uf Capacitor
14. C7 0.01 uf/50V Capacitor
15. C8 0.01 uf/50V Capacitor
16. C9 0.01 uf/50V Capacitor
17. C10 0.01 uf/50V Capacitor
18. C11 0.1 uf/50V Capacitor
19. pressure transducer 68 Fujikura pressure transducer
60. D1 1N4148 diode
21. D2 diode 24v zener
22. D3 1N4148 diode
23. D4 diode 24v zener
24. JP1 Header 3-way 2211S-03G
25. JP2 Header 2-way 2211S-02G
26. Jumper 2 position SPC19807
27. R1 Resistor Network 3-1 KOhm
28. R2 Resistor Network 3-1 KOhm
29. R23 Resistor Network 3-1 KOhm
30. R28 Resistor Network 3-1 KOhm
31. R8 Resistor Network 3-60 KOhm
32. R11 Resistor Network 3-60 KOhm
33. R12 Trimmer Potentiometer 1 MOhm
34. R9 Trimmer Potentiometer 5 KOhm
35. R3 8.2 KOhm 125 mW Resistor,
36. R4 47 KOhm 125 mW Resistor
37. R5 S.A.T. 125 mW Resistor
38. R6 60 Ohm 125 mW Resistor
39. R7 1 MOhm 125 mW Resistor 40. R30 1 MOhm 125 mW Resistor
41. R10 47 KOhm 125 mW Resistor
42. R33 82 KOhm 125 mW Resistor
43. R17 60 KOhm 125 mW Resistor
44. R18 S.A.T. 125 mW Resistor,
45. R19 S.A.T. Resistor 125 mW
46. R32 S.A.T. Resistor 125 mW
47. R60 Potentiometer 5 Kohm
48. R21 5.6 KOhm 125 mW Resistor
49. R29 249 Ohm 250 mW Resistor
50. R31 60 KOhm 125 mW Resistor
51. R26 1 MOhm 125 mW Resistor
52. R27 1 MOhm 125 mW Resistor
53. R13 12 KOhm 125 mW Resistor
54. R14 560 Ohm 125 mW Resistor
55. R15 1 KOhm 125 mW Resistor
56. R16 560 Ohm 125 mW Resistor
57. R22 S.A.T Resistor 125 mW
58. R24 S.A.T Resistor 125 mW
59. R25 S.A.T Resistor 125 mW
60. B3 S.A.T Buss Wire Jumper
61. B4 S.A.T Buss Wire Jumper
62. B5 S.A.T Buss Wire Jumper
63. B6 S.A.T Buss Wire Jumper
64. 9x O-ring Dash006 Buna N 0.07 In
65. 2X Screw 6-32 one inch long
66. 1X 4-40 Screw Â¼ inch long
67. 4X Screw 4-40 philips pan head Â¾ inch long
68. 2X Screw 8-32 philips Â¼ inch long
69. 8X Screw 4-40 Hex socket head cap screw Â¼ inch long
70. 2X Screw 4-40 Hex socket head cap screw ½ inch long
71. 4X Screw 60 mm long M4
72. the manifold 70
73. Right End cap 50
74. left end cap 42
75. support block 32
76. Bud Industries AN-1303 Enclosure 10 Modified
77. printed circuit board
78. first valve 98
79. exhaust valve 104
80. Connector D-Sub 9 pin
81 Jack screw D-Sub 4-40
82 Nut D-Sub 4-40

Relationship Between The Electronic Components:

A volt supply, control signal and feedback voltage may be introduced and retrieved from the device via the connector 24, which may be a 9-pin connector. U1, C1 and C2 may be combined to regulate the volt input voltage and/or volt supply voltage for the present invention. U2.1, R1.1, R1.2, R1.3, JP2, R29 and R31 may be combined to form an input buffer amplifier and also to allow the device to be controlled by a 1 to 5 volt signal or a 4 to 60 ma signal. R60, R21 and JP1 may combine to allow the device to be controlled remotely or locally in the 1 to 5 volt control configuration. C3, C11 and C4 may act as decoupling capacitors for U2, U3 and U4 respectively. R3, R4, R2.1 R2.2, R2.3, U2.2 and Q1 form a constant current circuit to drive the pressure transducer 68. R5 and R6 balance the output of the pressure transducer 68. U2.3, U2.4, R8.1, R8.2, R8.3, R7, R30, R10, R11.1, R11.2, R9, C5, R33 and R12 may form an instrument amplifier. R17, R18, R19, R32 and U3.1 may form a feedback buffer amplifier circuit. R13, R14, R15, R16, R22, Q2 and U3.2 may form a constant current circuit and a window in where the present invention does not need to make adjustments. U4.1, R23.1, R23.2, R23.3, R24, R26, C7, C8, Q3, D1 and D2 may form the pressure valve 98 driver circuit. B3, B4, B5 and B6 allow for the device to be configured for various modes of operation. U4.2, R28.1, R28.2, R28.3, R27, C9, C10, R25, Q4, D3 and D4 may form the exhaust valve 104.

How The Present Invention Works:

While +24VDC is applied to the present invention, the pressure transducer 68 may be constantly monitoring the output/exhaust pressure. The pressure transducer 68 may require a constant current source. This constant current source may be supplied by R3, R4, R2.1 R2.2, R2.3, U2.2 and Q1. The output of pressure transducer 68 may be amplified by the instrument amplifier circuitry consisting of U2.3, U2.4, R8.1, R8.2, R8.3, R7, R30, R10, R11.1, R11.2, R9, C5, R33 and R12. The pressure transducer 68 may be zero balanced by R5 & R6. As pressure may be called for by introducing a control signal to the present invention via U2.1, R1.1, R1.2, R1.3, JP2, R29 and R31 (the input buffer amplifier circuit) and this control signal gets above the window created by the constant current circuit generated by R13, R14, R15, R16, R22, Q2 and U3.2 the pressure valve 98 may be energized by the circuit consisting of U4.1, R23.1, R23.2, R23.3, R24, R26, C7, C8, Q3, D1 and D2. The amplified output of the instrument amplifier circuit for pressure transducer 68 may then used by R13, R14, R15, R16, R22, Q2 and U3.2 to generate a window and as long as the control signal is within this window no adjustments will be made to the pressure output. As the control signal is reduced below the window generated by R13, R14, R15, R16, R22, Q2 and U3.2 the exhaust valve 104 may be controlled using U4.2, R28.1, R28.2, R28.3, R27, C9, C10, R25, Q4, D3 and D4 and depending on the configuration of B3, B4, B5 and B6 104 may be energized or de-energized to exhaust pressure. Both the pressure valve control circuitry including U4.1, R23.1, R23.2, R23.3, R24, R26, C7, C8, Q3, D1 and D2 and the exhaust valve control circuitry including U4.2, R28.1, R28.2, R28.3, R27, C9, C10, R25, Q4, D3 and D4 may be capable of controlling either poppet or proportional valves 104.

How To Make The Present Invention:

Solder all electronic components listed above onto a printed circuit board. Trim excess lead length from the components. Install the O-rings 72 onto the manifold 70. Install valves 98 & 104 onto the manifold 70 using 4X Screws 4-40 Philips pan head Â¾ inch long. Solder electrical connections for pressure valve 98 and exhaust valve 104 into their appropriate locations on printed circuit board and/or control circuitry 60. Install the assembled printed circuit board onto the manifold 70 by placing the pressure port of pressure transducer 68 into the transducer port of the manifold 70. Using support block 32 and 2X Screw 4-40 Hex socket head cap screw ½ inch long secure printed circuit board to the manifold 70. Using 24AWG wire connect pin1 of the connector D-Sub 9 pin to point 1 of J1 on printed circuit board, connect pin3 of the connector D-Sub 9 pin to point 3 of J1 on printed circuit board, connect pin5 of the connector D-Sub 9 pin to point 5 of J1 on printed circuit board, connect pin6 of the connector D-Sub 9 pin to point 2 of J1 on printed circuit board, connect pin8 of the connector D-Sub 9 pin to point 4 of J1 on printed circuit boar, pin9 of the connector D-Sub 9 pin to point 6 of J1 on printed circuit board. Place this subassembly into Bud Industries AN-1303 enclosure 10 being careful align the cutouts for right end cap 50 and left end cap 42 with the manifold 70. Secure this subassembly to the Bud Industries AN-1303 enclosure 10 using 2X Screw 8-32 philips ¼ inch long, 2X Screw 6-32 one inch long and, 1X 4-40 Screw Â¼ inch long. With this new subassembly opened end up place it so that the cutouts are closest to your person. Install the left end cap 42 with the pressure port closest to your person using 4X Screw 4-40 Hex socket head cap screw Ⓐ ¾ inch long to the manifold 70 left side. Align the ports of right end cap 50 with the ports of the manifold 70 right side and secure using 4X Screws How To Use The Present Invention:

Attach a 110 psig input to the pressure port (left end cap port 48) connect the output (the first and second right end cap ports 56,58) to the requirement, connect +24 VDC to pin 1 of the connector D-Sub 9 pin, connect +24 VDC return to pin 6 of the connector D-Sub 9 pin, connect control signal to pin 3 of the connector D-Sub 9 pin, connect control signal return to pin 8 of the connector D-Sub 9 pin, connect feedback monitor to pin 5 of the connector D-Sub 9 pin, connect feedback monitor return to pin 9 of the connector D-Sub 9 pin, Adjust the control signal to obtain the desired output pressure and monitor the feedback to insure the proper pressure has been achieved.

The present invention may be configured to work in a closed volume. The present invention may be adapted to supply or not to supply downstream restrictive exhaust to atmosphere based in part on the control values the present invention is electro-mechanically connected to.

The present invention may be adapted to use either a normally closed exhaust valve or a normally open exhaust valve. If a normally closed exhaust valve is selected the present invention may maintain pressure in the event of a power failure. If a normally open exhaust valve is selected the present invention may exhaust pressure in the event of a power failure.

The present invention designed to work in two configurations: a first configuration, into a closed volume, wherein a downstream restrictive exhaust to atmosphere is not required; and a second configuration, wherein the present invention may supply downstream restrictive exhaust to atmosphere. The first configuration the exhaust valve 104 may be a poppet valve engaged with the manifold 70, left end cap 42 and right end cap 50 shown in FIGS. 2 and 3. In the second configuration the exhaust valve 104 may be a proportional valve engaged with the manifold 112, left end cap 122 and right end cap 126 shown in FIG. 16.

It should be understood, of course, that the foregoing relates to exemplary embodiments of the invention and that modifications may be made without departing from the spirit and scope of the present invention.

What is claimed is:

1. A pressure regulator comprising:
an enclosure forming a housing space comprising:
   a manifold forming at least one left port, a first right port, and a second right port;
   a first valve and an exhaust valve, each valve mounted to the manifold, wherein the first valve is fluidly connected to the at least one left port, and wherein the exhaust valve is fluidly connected to the second right port;
   a control circuitry mounted to the enclosure, wherein the control circuitry is electronically connected to the first valve and the exhaust valve for controlling pressure in at least one of the at least one left port, the first right port, and the second right port;
   a pressure transducer electronically connected to the control circuitry, and wherein the pressure transducer operatively engages the second right port;
a left end cap extending from an outer side of the enclosure into the housing space, wherein a left cap port is formed through the left end cap, and wherein the left cap port fluidly connects to the at least one left port; and
a right end cap extending from the outer side of the enclosure into the housing space, wherein a first and second cap ports are formed through the right end cap, and wherein the first and second cap ports fluidly connect to the first and second right ports, respectively.

2. The pressure regulator of claim 1, wherein the control circuitry further comprises a dual operational amplifier electronically interconnecting the first valve and the exhaust valve, wherein the dual operational amplifier is configured to correct pressure drops between at least two of the left port, the first right port, and the second right port by controlling the exhaust valve in a proportional manner.

3. The pressure regulator of claim 2, further comprising a constant current source connected to the pressure transducer.

4. The pressure regulator of claim 3, wherein the pressure transducer is zero balanced.

5. The pressure regulator of claim 4, wherein the exhaust valve is a poppet valve.

6. The pressure regulator of claim 5, wherein the pressure regulator is configured to operate in a closed volume.

7. The pressure regulator of claim 4, wherein the exhaust valve is a proportional valve.

8. The pressure regulator of claim 7, wherein the pressure regulator is configured to so that at least one of the first and second right ports is fluidly connected to atmosphere.

* * * * *